United States Patent
Inman et al.

(10) Patent No.: US 7,474,851 B2
(45) Date of Patent: Jan. 6, 2009

(54) OPTICAL TRANSCEIVER TESTER

(75) Inventors: Brad L. Inman, Hillsboro, OR (US); Jan P. Peeters Weem, Newark, CA (US); Rob J. Hensel, Gaston, OR (US)

(73) Assignee: Intel Corporation, Santa Clara, CA (US)

( * ) Notice: Subject to any disclaimer, the term of this patent is extended or adjusted under 35 U.S.C. 154(b) by 693 days.

(21) Appl. No.: 10/948,965

(22) Filed: Sep. 24, 2004

(65) Prior Publication Data

US 2006/0067688 A1 Mar. 30, 2006

(51) Int. Cl.
*H04B 10/08* (2006.01)
*H04B 17/00* (2006.01)

(52) U.S. Cl. ............... 398/22; 398/9; 398/16; 398/24

(58) Field of Classification Search .......... 398/9, 398/12, 19, 22–25, 33, 128, 130, 135, 138, 398/143–144, 16, 140, 139, 141, 158; 356/218–219, 356/213, 222, 226, 303, 478, 73.1, 926; 702/104, 702/166, 117, 118, 122, 135; 455/66.1, 67.11, 455/67.13
See application file for complete search history.

(56) References Cited

U.S. PATENT DOCUMENTS

| | | | | |
|---|---|---|---|---|
| 6,002,501 A | * | 12/1999 | Smith et al. | 398/9 |
| 6,590,644 B1 | * | 7/2003 | Coin et al. | 356/218 |
| 7,167,236 B2 | * | 1/2007 | Suino | 356/73.1 |
| 7,263,286 B2 | * | 8/2007 | Peng | 398/22 |
| 2005/0074236 A1 | * | 4/2005 | Urimindi et al. | 398/12 |
| 2005/0265717 A1 | * | 12/2005 | Zhou | 398/9 |

* cited by examiner

*Primary Examiner*—M. R. Sedighian
(74) *Attorney, Agent, or Firm*—Blakely, Sokoloff, Taylor & Zafman LLP

(57) ABSTRACT

In embodiments of the present invention, an optical device tester performs stressed eye testing on several optical receivers and transmission and dispersion penalty testing on optical transmitters at a variety of data rates wavelengths using single mode optical signals and multimode optical signals using a variety of supply voltages and temperatures.

6 Claims, 5 Drawing Sheets

| 502 | 504 | 506 | 508 | 510 | 512 | 514 | 516 | 518 |
|---|---|---|---|---|---|---|---|---|
| Slot | Device | Test | Result | Mode | Wavelength | Bit rate | Voltage | Temp |
| 106A | Receiver | Stressed eye | Pass/Fail | Single | 1310 nm | .5 Gbps | N/A | N/A |
| 106B | Receiver | Stressed eye | BER | Single | 1550 nm | 1 Gbps | N/A | N/A |
| 106C | Receiver | Stressed eye | Pass/Fail | Multiple | 850 nm | 2 Gbps | N/A | N/A |
| 106D | Transmitter | TDP | ΔOMA | Single | 1310 nm | 5 Gbps | N/A | N/A |
| 106E | Transmitter | TDP | ΔOMA | Single | 1550 nm | 10 | N/A | N/A |
| 106F | Receiver | Variable power | BER | Single | 1310 nm | 20 | ±5% | |
| . . . | | | | | | | | |
| 106N | Receiver | Variable temp. | BER | Single | 1310 nm | 25 | N/A | -5 ≤ T ≤ 75C |

OPTICAL TRANSCEIVER TESTER

BACKGROUND

1. Field

Embodiments of the present invention relate to optical transceivers and, in particular, to testing optical transceivers.

2. Discussion of Related Art

Optical transmitter-receiver pairs, or transceivers, may be used in communication systems and/or networks to transmit and receive data and/or other information on optical signals. To ensure proper operation, optical transceiver performance may be tested. Traditional optical transceiver testing has limitations, however.

BRIEF DESCRIPTION OF THE DRAWINGS

In the drawings, like reference numbers generally indicate identical, functionally similar, and/or structurally equivalent elements. The drawing in which an element first appears is indicated by the leftmost digit(s) in the reference number, in which:

FIG. 5 is a graphical representation of test parameters for an optical device test system according to an embodiment of the present invention.

DETAILED DESCRIPTION OF THE ILLUSTRATED EMBODIMENTS

Figure 1:
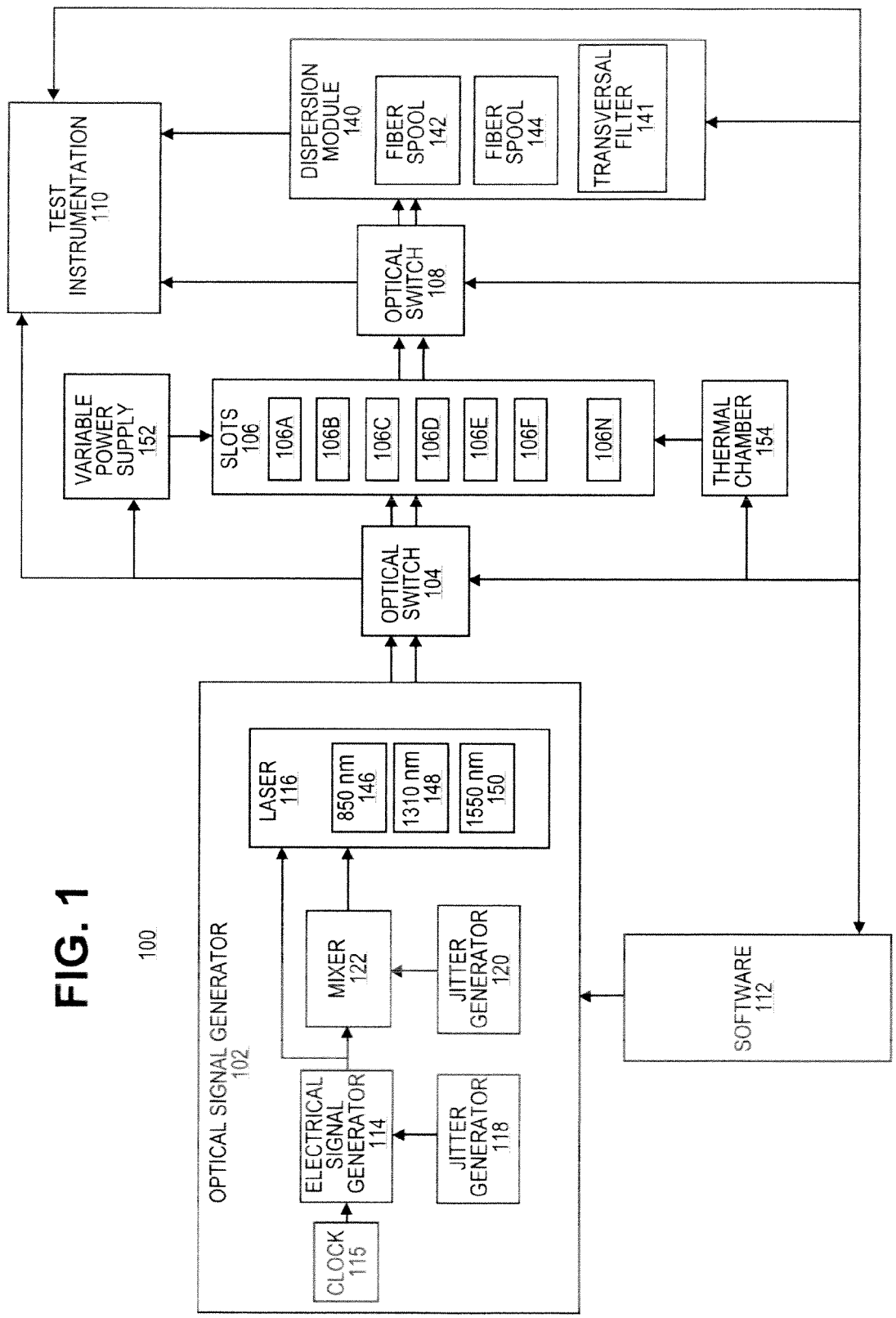
FIG. 1 is a high-level block diagram of an optical device tester according to an embodiment of the present invention.

FIG. 1 is a high-level block diagram of an optical transceiver tester 100 according to an embodiment of the present invention. In the illustrated embodiment, the system 100 includes an optical signal generator 102 coupled to an optical switch 104. The illustrated optical switch 104 is coupled to several slots or bays 106 (such as, for example slots 106A, 106B, 106C, 106D, 106E, 106F, . . . 106N) where devices-under-test (DUT) may be installed or inserted. The illustrated slots 106 are coupled to a second optical switch 108. The illustrated optical switch 108 is coupled to test instrumentation 110. In the illustrated embodiment, software 112 is coupled to the optical signal generator 102.

In the illustrated embodiment, the optical signal generator 102 includes an electrical signal generator 114 coupled to a light source 116. The example optical signal generator 102 also may include a clock 115 coupled to the electrical signal generator 114, a jitter generator 118 coupled to the electrical signal generator 114, and a second jitter generator 120 coupled to a mixer 122.

In the illustrated embodiment, the optical switch 108 is coupled to an dispersion module 140, which is coupled to the instrumentation 110. The illustrated dispersion module 140 includes a transversal filter 141, a fiber spool 142, and a second fiber spool 144.

In the illustrated embodiment, the light source 116 includes several lasers. For example, the illustrated light source includes an 850 nanometer (850 nm) laser 146, a 1310 nm laser 148, and a 1550 nm laser 150.

In the illustrated embodiment, a variable power supply 152 is coupled to the slots 106. Also in the illustrated embodiment, a thermal chamber 154 is coupled to the slots 106.

In embodiments of the present invention, the optical signal generator 102 components may operate as follows. The electrical signal generator 114 may generate a data stream 124. The data stream 124 may include a pseudorandom bit sequence. The example pseudorandom bit sequence may be a PRSB-31, which may include $2^{31}-1$ (or approximately 2.1 billion) bits and that may repeat every two seconds at one Gbps or every twenty seconds at ten Gbps. Alternatively, the pseudorandom bit sequence may be a PRSB-7, which may include $2^{7}-1$ (or approximately 127) bits and that may repeat many times per second at one Gbps or at ten Gbps.

The clock 115 may provide a clock signal to the electrical signal generator 114 to control the data rate of the data stream 124. For example, the clock 115 may provide a clock signal having a frequency in the range of approximately fifty megahertz (50 MHz) to approximately ten gigahertz (10 GHz) or greater, for example, from a clock 115, to generate the data stream 124. In one embodiment, the clock signal provides a 1.25 GHz clock signal to the electrical signal generator 114, which in response generates the data stream 124 having a data rate of 2.5 Gbps. In an alternative embodiment, the clock signal provides a 5 GHz clock signal to the electrical signal generator 114, which in response generates the data stream 124 having a data rate of ten Gbps.

Figure 2:
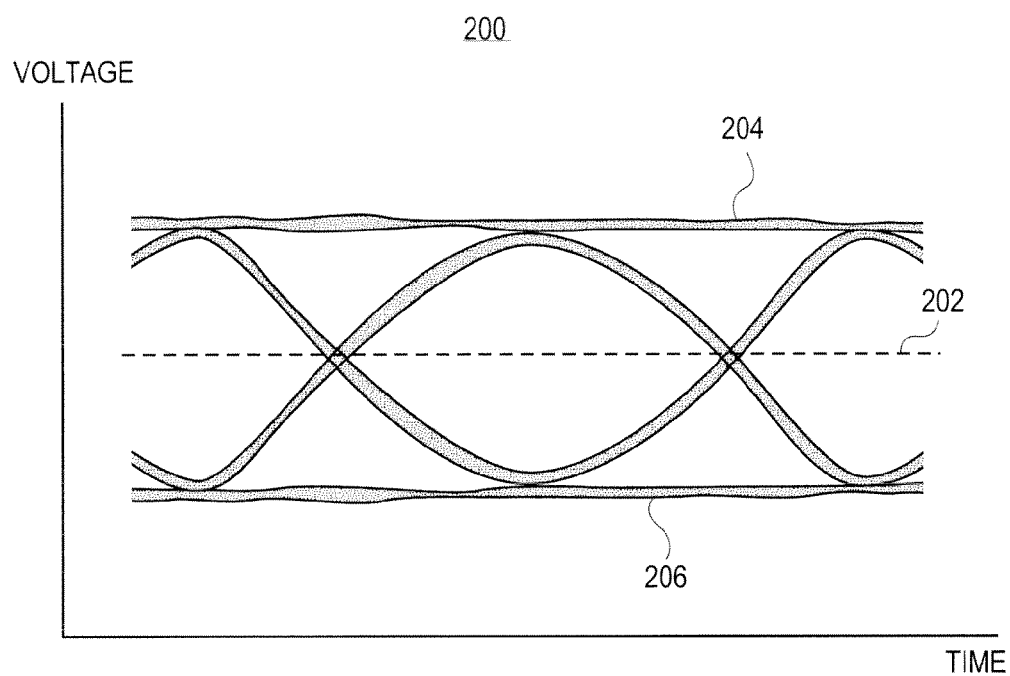
FIG. 2 is a graphical representation of an optical signal according to an embodiment of the present invention.

In one embodiment, the data stream 124 may be applied to the light source 116 to the light source 116, which may convert the electrical signal to an optical signal 130. FIG. 2 is a graphical representation (or eye diagram 200) of the optical signal 130 according to an embodiment of the present invention.

In one embodiment, the eye diagram 200 may include the data bits acquired from the data stream 124 overlaid on top of each other. In the illustrated embodiment, the optical signal 130 includes a direct current (DC) bias level 202, which may be representative of average optical power in the optical signal 130, an amplitude 204, which may be representative of a logic level "1" for the optical signal 130, and an amplitude 206, which may be representative of a logic level "0" for the optical signal 130.

In one embodiment, the eye diagram 200 may be acquired and viewed using the test instrumentation 110 using, for example, a general-purpose interface bus (GPIB). In the illustrated embodiment, the optical signal 130 includes a clean optical signal and the eye in the eye diagram 200 is substantially open.

In an alternative embodiment, the optical signal generator 102 generates an intentionally impaired or intentionally distorted optical signal 131. For example, jitter 132 may applied to the electrical signal generator 114 to introduce the jitter in the data stream 124 and the mixer 122 may mix the impaired data stream 124 with jitter 134. In embodiments of the present invention, jitters 132 and or 134 may be horizontal jitter, timing jitter, sine jitter, sine interference, vertical jitter, and/or amplitude jitter.

Figure 3:
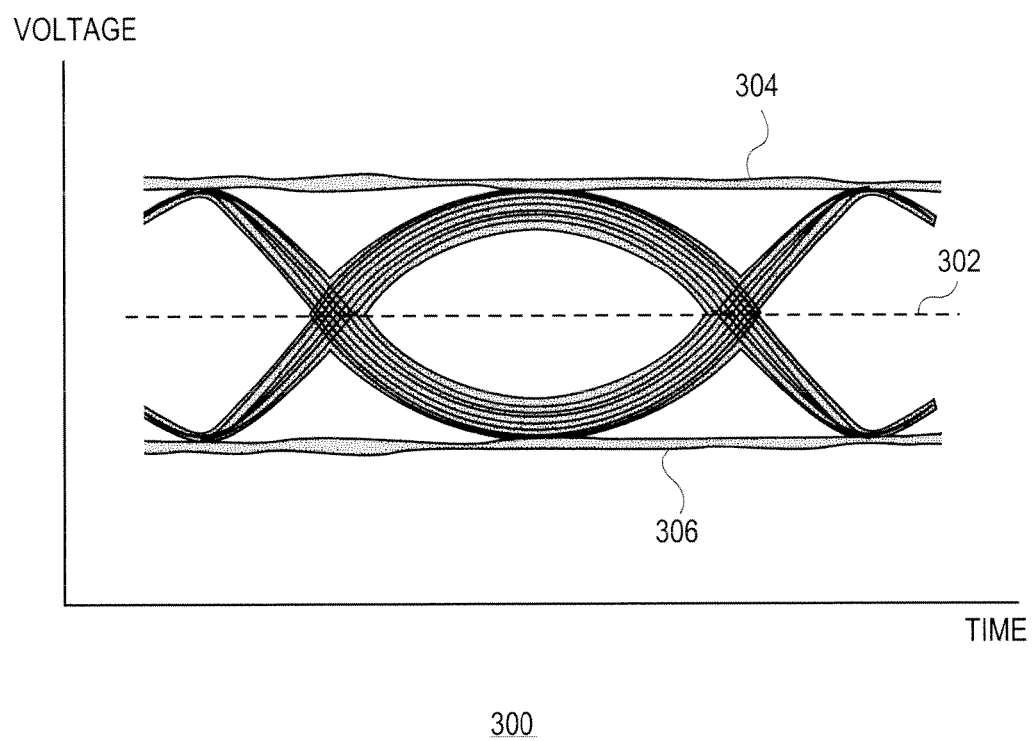
FIG. 3 is a graphical representation of an optical signal according to an alternative embodiment of the present invention.

The resulting electrical signal 136 having the data stream 124 impaired by the jitter 132 and 134 may be applied to the light source 116 to generate an intentionally impaired or intentionally distorted optical signal 131. FIG. 3 is a graphical representation (or eye diagram 300) of the optical signal 131 according to an embodiment of the present invention in which the eye in the eye diagram 300 is somewhat closed or stressed. In one embodiment, the closure or stress on the eye in the eye diagram 300 may be an indication that there are bit errors in the data stream 124 caused by introducing jitter 132 and 134 into the data stream 124.

Like the eye diagram 200, the eye diagram 300 may include the data bits acquired from the data stream 124 overlaid on top of each other, and the optical signal 130 includes a direct current (DC) bias level 302, an amplitude 304, and an amplitude 306.

Referring back to FIG. 1, in the illustrated embodiment, the optical switch 104 couples the optical signal 130 to the instrumentation 110 and the optical signals 130 and 131 to individual slots in the slots 106. The optical switch 104 may include a 1×10 optical switch, a 1×8 optical switch, or several optical switches that couple the optical signal 130 to the instrumentation 110 and the optical signal 131 to individual slots in the slots 106.

An individual slot 106 may be any suitable slot or bay that may receive an optical device. In embodiments of the present invention, an individual slot 106 may receive optical devices such as, for example, transmitters, receivers, transceivers, transmitter-receiver pairs, and/or transponders. Such optical devices may include, for example, devices compatible with the Institute of Electrical and Electronics Engineers (WEE) 802.3ae standard, IEEE std. 802.3ae- 2002, published 2002. For example, one or more of the individual slots 106 may be populated with devices of the XFP family of devices, the XENPAK family of devices, and/or X-Pak family of devices. Alternatively, 300-pin multi-source agreement (MS A) lO Gigabit Ethernet (1OGbE) optical devices may be disposed in one or more of the individual slots 106.

In the illustrated embodiment, the optical switch 108 couples an optical signal 133 from the individual slots in the slots 106 to the instrumentation 110 and couples the optical signal 130 from the individual slots 106 to the dispersion module 140. The optical switch 108 may include a 10×1 optical switch, an 8×1 optical switch, or several optical switches that couple the optical signal 133 to the instrumentation 110 and/or the dispersion module 140.

The instrumentation 110 may be any suitable instrumentation that can measure optical signal power levels, electrical signal power levels, bit rates, wavelengths, voltages, and/or other parameters. In embodiments of the present invention, the instrumentation 110 may include any one or a combination of an oscilloscope, a digital communications analyzer, a bit error rate tester, a signal analyzer, and/or an error performance analyzer.

In one embodiment, the software 112 may include a graphically user interface (GUI) written on top of Microsoft Windows® operating system, for example, that a test operator may use to input parameters for one or more tests to be conducted on devices in the slots 106. The software 112 may be interfaced with other components in the tester 100 using general-purpose interface bus (GPIB), for example.

In one embodiment, the electrical signal generator 114 may be any suitable instrumentation and/or circuitry that can generate a variety of pseudorandom bit sequences, such as, for example, PRBS $2^{31}$-1, PRBS $2^{23}$-1, PRBS $2^{15}$-1, PRBS $2^{10}$-1, and/or PRBS $2^{7}$-1, or other suitable bit sequence, over a range of bit rates and/or clock frequencies.

The light source 116 may be suitable laser, such as, for example, a laser diode, that can convert an electrical signal to an optical signal. In embodiments of the present invention, the 850 nm laser 146 may be a multimode laser, the 1310 nm laser 148 may be a single mode laser, and the 1550 nm laser 150 may be a single mode laser.

In one embodiment, the jitter generator 118 may be any suitable instrumentation and/or circuitry that can generate timing jitter and/or horizontal jitter, the jitter generator 120 may be any suitable instrumentation and/or circuitry that can generate amplitude jitter and/or vertical jitter, and the mixer 122 may be any suitable device and/or circuitry that can combine the jitter 132 and 134 with the data stream 124. In one embodiment, the mixer 122 may be a radio frequency (RF) mixer.

In one embodiment, the optical fiber spool 142 may include single mode optical fiber having a length of approximately forty kilometers. In one embodiment, the optical fiber spool 144 may include single mode optical fiber having a length of approximately ten kilometers. In the illustrated embodiment, an optical signal 135 is coupled between the dispersion module 140 to the instrumentation 110.

Figure 4:
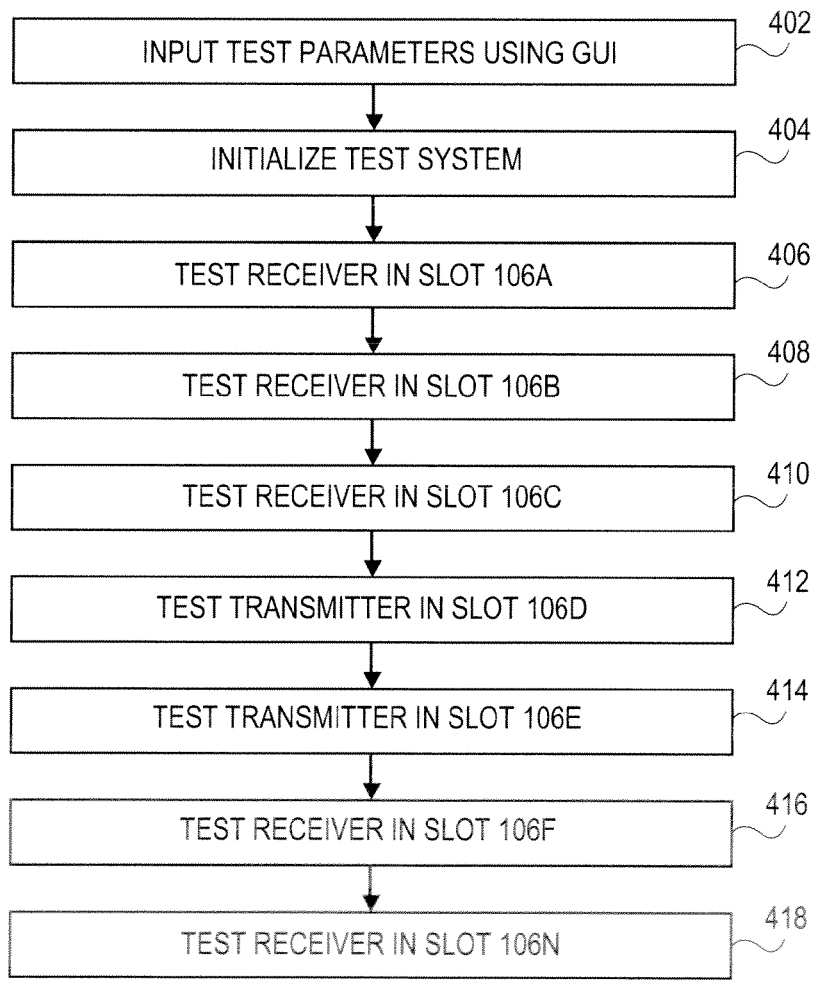
FIG. 4 is a flowchart illustrating an approach to operating an optical device test system according to an embodiment of the present invention.

FIG. 4 is a flowchart illustrating a method 400 of operating of the tester 100 according to an embodiment of the present invention. The method 400 begins with a block 402 in which a test operator may input test parameters into the tester 100, using the GUI of the software 112, for example, for the tester 100 to implement.

FIG. 5 is a graphical representation 500 showing example parameters to be entered into the tester 100. In the illustrated embodiment, the graphical representation includes a column 502 listing the slot to be selected. In the illustrated embodiment, the graphical representation includes a column 504 listing the device to be installed in the selected slot.

In the illustrated embodiment, the graphical representation includes a column 506 listing the type of test to be performed on the device. One type of test may be a stressed eye test in which an optical signal is stressed in a deterministic manner, such as the optical signal 131, for example, is applied to a receiver to test the receiver's performance under non-ideal conditions.

Another type of test may be a transmitter and dispersion penalty (TDP) test in which an optical signal that has not been intentionally distorted, such as the optical signal 130, for example, is applied to a receiver and a transmitter and is retransmitted through dispersion devices, such as the dispersion module 140, or a transversal filter (not shown), for example.

In the illustrated embodiment, the graphical representation includes a column 508 listing the type of test result expected after a test is performed. For example, a receiver's performance may be evaluated by measuring the bit error rate of the optical signal out of the receiver, such as the bit error rate (BER) of the optical signal 133. Alternatively, the receiver's performance may be evaluated by determining whether the receiver passed or failed a particular test, such as failure to meet a predetermined bit error rate.

A transmitter's performance may be evaluated by comparing the optical modulation amplitude (OMA) of a reference optical signal, such as for example, the optical signal 130, with the OMA of the optical signal output from the device under test, such as for example, an optical signal 135, which is output from the dispersion module 140. In one embodiment, the OMA may be the difference in optical power levels for the logic level "1" and logic level "0" of the optical signal 130 and the optical signal 135.

In the illustrated embodiment, the graphical representation includes a column 510 listing whether the optical signal 130 and/or 131 are to be single mode or multimode.

In the illustrated embodiment, the graphical representation includes a column 512 listing operating wavelengths in nanometers.

In the illustrated embodiment, the graphical representation includes a column 514 listing bit rates in Gbps.

In the illustrated embodiment, the graphical representation includes a column 516 listing a voltage range, which may be a percentage of the supply voltage to the devices in the slots 106 as provided by the variable power supply 152.

In the illustrated embodiment, the graphical representation includes a column 518 listing a temperature range to which the devices in the slots 106 may be subjected during testing as provided by the thermal chamber 154.

The listing of parameters in FIG. 5 is not exhaustive and in embodiments of the present invention, the test operator also may input other parameters as well such as receiver manufacturer and test sequence, for example, whether to test all the receivers first, then the transmitters, whether to perform the single mode test first and the multimode tests second, whether to group the testing based on operating wavelength, etc. For purposes of illustration, we will assume that the sequence is slot 106A, slot 106B, slot 106C, slot 106D, slot 106E, slot 106F, and slot 106N.

Referring back to FIG. 4, in a block 404, in response to the test operator inputs the software 112 may initialize tester 100 and cause the tester 100 to perform the blocks below without operator intervention. In one embodiment, the software 112 may initialize the tester 100 using previous calibration settings, for example.

In a block 406, the tester 100 tests the receiver in the slot 106A. In one embodiment, the software 112 may cause the optical signal generator 102 to generate the optical signal 131 as a single mode optical signal having a wavelength of 1310 nanometers and a bit rate of 0.5 Gbps, the optical switch 104 to switch the optical signal 131 to the slot 106A so that a stressed eye test may be performed on the receiver in the slot 106A, the optical switch 108 to couple the optical signal 133 to the instrumentation 110, and the instrumentation to indicate whether the receiver in the slot 106A passed or failed the stressed eye test. In one embodiment, the instrumentation 110 may store the results of the test.

In a block 408, the tester 100 tests the receiver in the slot 106B. In one embodiment, the software 112 may cause the optical signal generator 102 to generate the optical signal 131 as a single mode optical signal having a wavelength of 1550 nanometers and a bit rate of one Gbps, the optical switch 104 to switch the optical signal 131 to the slot 106B so that a stressed eye test may be performed on the receiver in the slot 106B, the optical switch 108 to couple the optical signal 133 to the instrumentation 110, and the instrumentation to indicate the bit error rate of the receiver in the slot 106B. In one embodiment, the instrumentation 110 may store the results of the test.

In a block 410, the tester 100 tests the receiver in the slot 106C. In one embodiment, the software 112 may cause the optical signal generator 102 to generate the optical signal 131 as a multimode optical signal having a wavelength of 850 nanometers and a bit rate of two Gbps, the optical switch 104 to switch the optical signal 131 to the slot 106C so that a stressed eye test may be performed on the receiver in the slot 106C, the optical switch 108 to couple the optical signal 133 to the instrumentation 110, and the instrumentation to indicate whether the receiver in the slot 106C passed or failed the stressed eye test. In one embodiment, the instrumentation 110 may store the results of the test.

In a block 412, the tester 100 tests the transmitter in the slot 106D. In one embodiment, the software 112 may cause the optical signal generator 102 to generate the optical signal 130 as a single mode optical signal having a wavelength of 1310 nanometers and a bit rate of five Gbps, the optical switch 104 to switch the optical signal 130 to the instrumentation 110 and to the slot 106D, the optical switch 108 to couple the optical signal 137 from the slot 106D to the dispersion device 140, and the instrumentation 110 to indicate whether the receiver in the slot 106D passed or failed the TDP test by comparing the OMA of the optical signal 135 to the OMA of the optical signal 130, for example. In one embodiment, the instrumentation 110 may store the results of the test.

In a block 412, the tester 100 tests the transmitter in the slot 106D. In one embodiment, the software 112 may cause the optical signal generator 102 to generate the optical signal 130 as a single mode optical signal having a wavelength of 1310 nanometers and a bit rate of five Gbps, the optical switch 104 to switch the optical signal 130 to the instrumentation 110 and to the slot 106D, the optical switch 108 to couple the optical signal 135 from the slot 106D to the dispersion device 140, and the instrumentation 110 to indicate whether the receiver in the slot 106D passed or failed the TDP test by comparing the OMA of the optical signal 135 to the OMA of the optical signal 130, for example. In one embodiment, the instrumentation 110 may store the results of the test In a block 414, the tester 100 tests the transmitter in the slot 106E. In one embodiment, the software 112 may cause the optical signal generator 102 to generate the optical signal 130 as a single mode optical signal having a wavelength of 1550 nanometers and a bit rate of ten Gbps, the optical switch 104 to switch the optical signal 130 to the instrumentation 110 and to the slot 106E, the optical switch 108 to couple the optical signal 135 from the slot 106E to the dispersion device 140, and the instrumentation 110 to indicate whether the receiver in the slot 106E passed or failed the TDP test by comparing the OMA of the optical signal 135 to the OMA of the optical signal 130, for example. In one embodiment, the instrumentation 110 may store the results of the test.

In a block 418, the tester 100 tests the receiver in the slot 106F. In one embodiment, the software 112 may cause the optical signal generator 102 to generate the optical signal 131 as a single mode optical signal having a wavelength to 1330 nanometers and a bit rate of twenty Gbps, the optical switch 104 to switch the optical signal 131 to the slot 106F so that a stressed eye test may be performed on the receiver in the slot 106F, the optical switch 108 to couple the optical signal 133 to the instrumentation 110, the instrumentation to indicate the bit error rate of the receiver in the slot 106F, and the stressed eye test to be performed a first, second, and third time as supply voltage to the slot 106F is changed from a first value, a second value, and a third value, respectively, to determine the bit error rate at the first, second, and third values, respectively. In one embodiment, the instrumentation 110 may store the results of the test.

In a block 418, the tester 100 tests the receiver in the slot 106N. In one embodiment, the software 112 may cause the optical signal generator 102 to generate the optical signal 131 as a single mode optical signal having a wavelength of 1550 nanometers and a bit rate of twenty-five Gbps, the optical switch 104 to switch the optical signal 131 to the slot 106N so that a stressed eye test may be performed on the receiver in the slot 106N, the optical switch 108 to couple the optical signal 135 to the instrumentation 110, the instrumentation to indicate the bit error rate of the receiver in the slot 106N, and the stressed eye test to be performed a first, second, and third time as the temperature of the slot 106F is changed from a first value, a second value, and a third value, respectively, to determine the bit error rate at the first, second, and third values, respectively. In one embodiment, the instrumentation 110 may store the results of the test.

The operations of the method 400 have been described as multiple discrete blocks performed in turn in a manner that may be most helpful in understanding embodiments of the invention. However, the order in which they are described should not be construed to imply that these operations are necessarily order dependent or that the operations be performed in the order in which the blocks are presented. Of course, the method 400 is an example process and other processes may be used to implement embodiments of the present invention. A machine-accessible medium with machine-readable data thereon may be used to cause a machine, such as, for example, a processor to perform the method 400.

Figure 6:
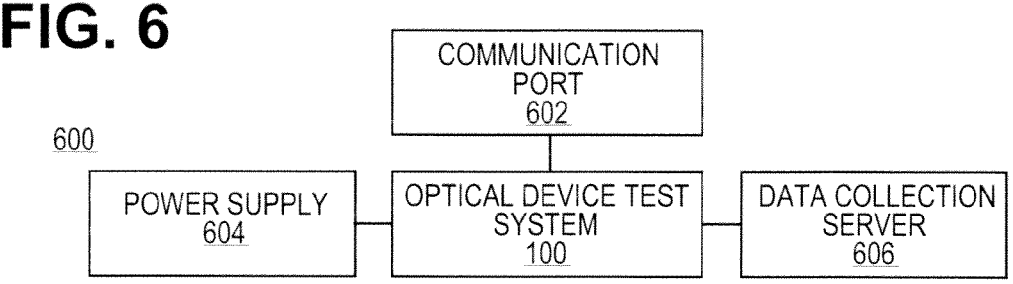
FIG. 6 is a high-level block diagram of a test system according to an embodiment of the present invention.

FIG. 6 is a high-level block diagram of a test system 600 according to an embodiment of the present invention. The illustrated test system 600 includes the tester 100 coupled to a communications port 602 and a power supply 604. In the illustrated embodiment, the communication port 602 is coupled to a data collection server 606.

In one embodiment, the tester 100 sends the results of the tests performed in the tester 100 to the data collection server 606, as data logs and/or data collection files, for example. The data collection server 606 may send the results to a database (not shown).

In one embodiment, the communication port 102 may be an Ethernet port, such as a Gigabit Ethernet port. In alternative embodiments, the communication port 602 may be a modem, a telephone line, or other suitable communication port.

Embodiments of the present invention may be implemented using hardware, software, or a combination thereof. In implementations using software, the software may be stored on a machine-accessible medium.

A machine-accessible medium includes any mechanism that may be adapted to store and/or transmit information in a form accessible by a machine (e.g., a computer, network device, personal digital assistant, manufacturing tool, any device with a set of one or more processors, etc.). For example, a machine-accessible medium includes recordable and non-recordable media (e.g., read only memory (ROM), random access memory (RAM), magnetic disk storage media, optical storage media, flash memory devices, etc.), as recess as electrical, optical, acoustic, or other form of propagated signals (e.g., carrier waves, infrared signals, digital signals, etc.).

In the above description, numerous specific details, such as, for example, particular processes, materials, devices, and so forth, are presented to provide a thorough understanding of embodiments of the invention. One skilled in the relevant art will recognize, however, that the embodiments of the present invention may be practiced without one or more of the specific details, or with other methods, components, etc. In other instances, recess-known structures or operations are not shown or described in detail to avoid obscuring the understanding of this description.

Reference throughout this specification to "one embodiment" or "an embodiment" means that a particular feature, structure, process, block, or characteristic described in connection with an embodiment is included in at least one embodiment of the present invention. Thus, the appearance of the phrases "in one embodiment" or "in an embodiment" in various places throughout this specification does not necessarily mean that the phrases all refer to the same embodiment. The particular features, structures, or characteristics may be combined in any suitable manner in one or more embodiments.

The terms used in the following claims should not be construed to limit embodiments of the invention to the specific embodiments disclosed in the specification and the claims. Rather, the scope of embodiments of the invention is to be determined entirely by the following claims, which are to be construed in accordance with established doctrines of claim interpretation.

What is claimed is:

1. An apparatus, comprising:
   a signal generator to generate a single mode optical signal and a multimode optical signal, the single mode optical signal and the multimode optical signal being intentionally impaired; and
   an optical switch to switch the single mode optical signal and the multimode optical signal to a slot, the slot to be populated with a transceiver to be tested using the single mode optical signal and the multimode optical signal.

2. The apparatus of claim 1, further comprising a power supply to supply a first supply voltage and a second supply voltage to the first and/or the second slot, the first supply voltage being different from the second supply voltage.

3. The apparatus of claim 2, further comprising a thermal unit to subject the first and/or the second slot to a first temperature and a second temperature, the first temperature being different from the second temperature.

4. A system, comprising:
   a tester having:
      a signal generator to generate a single mode optical signal and a multimode optical signal, the single mode optical signal and the multimode optical signal being intentionally impaired; and
      an optical switch to couple the single mode optical signal and the multimode optical signal to a slot, the slot to be populated with a receiver to be tested using the single mode optical signal and the multimode optical signal; and
   a communication port to receive results of a test performed on the receiver.

5. The system of claim 4, wherein the communication port comprises an Ethernet port.

6. The system of claim 5, wherein the communication port comprises Gigabit Ethernet port.

* * * * *